United States Patent [19]

Kubo et al.

[11] Patent Number: 4,675,171

[45] Date of Patent: Jun. 23, 1987

[54] PRODUCTION OF FINELY-DIVIDED PARTICULATE BISMUTH OXIDE

[75] Inventors: Shigeki Kubo; Osamu Yamamoto, both of Niihama, Japan

[73] Assignee: Sumitomo Metal Mining Company Limited, Tokyo, Japan

[21] Appl. No.: 805,098

[22] Filed: Dec. 5, 1985

[30] Foreign Application Priority Data

Dec. 10, 1984 [JP] Japan .............................. 59-260299

[51] Int. Cl.$^4$ ............................................ C01B 27/00
[52] U.S. Cl. .................................................. 423/617
[58] Field of Search ......................................... 423/617

[56] References Cited

U.S. PATENT DOCUMENTS

| | | | |
|---|---|---|---|
| 1,300,522 | 4/1919 | Vollkommer | 423/617 |
| 1,318,336 | 10/1919 | Ellis | 423/617 |
| 1,425,918 | 8/1922 | Thomson | 423/623 |
| 2,177,551 | 10/1939 | Perkins et al. | 423/617 |
| 3,306,760 | 2/1967 | Zirngibl et al. | 423/579 |
| 3,467,498 | 9/1969 | Benner et al. | 423/617 |
| 3,525,595 | 8/1970 | Zirngibl et al. | 423/617 |

Primary Examiner—John Doll
Assistant Examiner—Wayne A. Langel
Attorney, Agent, or Firm—Watson, Cole, Grindle & Watson

[57] ABSTRACT

Finely-divided particulate bismuth oxide is produced by the steps of heating bismuth at 800° C. or above in a first compartment of a sealed vessel divided into two compartments by a partition wall, the two compartments communicating with each other by a hole provided on the partition wall, feeding an inert gas such as nitrogen and argon into the first compartment so that the bismuth vapor formed by heating bismuth has a bismuth concentration of 0.1 to 0.5 g/liter, blowing air into the bismuth vapor introduced from the first compartment into the second compartment through the hole on the partition wall, permitting the air to mix with the bismuth vapor to form bismuth oxide and simultaneously cooling the thus formed bismuth oxide to 250° to 300° C., discharging by suction the bismuth oxide from the sealed vessel at a flow rate of 1 to 5 m/sec, and cooling the discharged bismuth oxide by supplying cooling air outside the sealed vessel.

7 Claims, 1 Drawing Figure

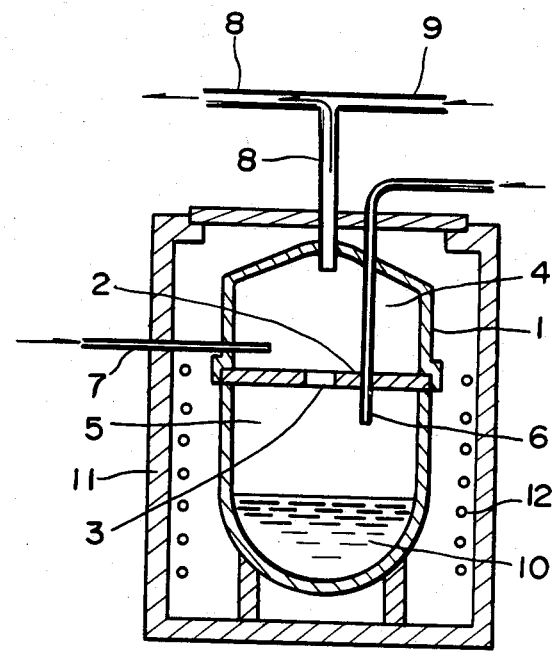

PRODUCTION OF FINELY-DIVIDED PARTICULATE BISMUTH OXIDE

BACKGROUND OF THE INVENTION

1. Field of the Invention:

The present invention relates to a process for producing finely-divided particulate bismuth oxide from bismuth.

2. Description of the Prior Art:

Among the conventional processes for producing finely-divided particulate bismuth oxide are:

(1) a wet process in which an alkali is added to an aqueous solution of bismuth nitrate or chloride to form precipitates of bismuth subnitrate or bismuth hydroxide, and the precipitates are subsequently separated from the mother liquor, followed by calcination; and (2) a dry process in which bismuth is compulsorily oxidized in an electric furnace and the vaporized bismuth oxide is collected.

The first process has a disadvantage that the product contains alkali metal and nitrate groups and is rather coarse in particle diameter (2 to 10 $\mu$m). The second process also has a disadvantage that the product has a large particle diameter (5 to 10 $\mu$m) although it contains no impurities.

SUMMARY OF THE INVENTION

It is an object of the present invention to provide a process for producing bismuth oxide of high purity in the form of spherical particles having a particle diameter of 0.2 to 1 $\mu$m, preferably having an average particle diameter of 0.5 $\mu$m. The particulate bismuth oxide is useful as an additive for condensers.

The gist of the present invention resides in a process for producing finely-divided particulate bismuth oxide which comprises the steps of heating bismuth at 800° C. or above in a first compartment of a sealed vessel divided into two compartments by a partition wall, the two compartments communicating with each other by a hole provided on the partition wall, feeding an inert gas such as nitrogen and argon into the first compartment so that the bismuth vapor formed by heating bismuth has a bismuth concentration of 0.1 to 0.5 g/liter, blowing air into the bismuth vapor introduced from the first compartment into the second compartment through the hole on the partition wall, permitting the air to mix with the bismuth vapor to form bismuth oxide and simultaneously cooling the thus-formed bismuth oxide to 250° to 300° C., discharging by suction the bismuth oxide from the sealed vessel at a flow rate of 1 to 5 m/sec, and cooling the discharged bismuth oxide by supplying cooling air outside the sealed vessel.

BRIEF DESCRIPTION OF THE DRAWINGS

The accompanying FIGURE is a sectional view showing an apparatus used for producing bismuth oxide according to the process of this invention.

DETAILED DESCRIPTION OF THE INVENTION

The process of this invention is practiced by using an apparatus as shown in the accompanying drawing. The apparatus is a sealed vessel (1) made up of a graphite crucible and a graphite lid. The sealed vessel is divided into two compartments, for example, an upper compartment (4) and a lower compartment (5), by a graphite partition wall (2). The upper compartment (4) and lower compartment (5) communicate with each other by a hole (3) provided on the partition wall (2). With bismuth (10) placed in the lower compartment (5), the sealed vessel is heated to 800° C. or above in an electric furnace (11) provided with a heater (12). Upon heating, bismuth (10) is vaporized. At the same time, an inert gas such as nitrogen or argon is blown into the lower compartment (5) through an inlet pipe (6) so that the concentration of the bismuth vapor is adjusted to 0.1 to 0.5 g/liter. The bismuth vapor adjusted to a proper concentration is transferred from the lower compartment (5) to the upper compartment (4) through the hole (3) on the partition wall (2). Air is introduced into the upper compartment (4) through an inlet pipe (7). The amount of air is less than, preferably about half, the amount of the inert gas blown into the lower compartment. The air thus introduced oxidizes the bismuth vapor, and it simultaneously lowers the temperature of the bismuth vapor to 250° to 300° C. The bismuth oxide thus formed is then sucked out at a flow rate of 1 to 5 m/sec by a suction pump connected to the upper compartment through a suction pipe (8). Cooling air at about 5° C. is supplied to the suction pipe (8) through an air supply pipe (9) to rapidly cool the bismuth oxide. Thus there is obtained finely divided spherically particulate bismuth oxide.

According to the process of this invention, the heating temperature is 800° C. or above, preferably in the range of 1000° to 1250° C. This is necessary to increase the yields by keeping the vapor pressure of bismuth comparatively high. Heating above 1250° C. does not increase the yields any more.

An inert gas is used instead of air to adjust the concentration of bismuth vapor in order to avoid the formation of bismuth oxide that floats on the melt of bismuth, preventing the vaporization of bismuth.

The bismuth vapor should be properly diluted so that it contains 0.1 to 0.5 g of bismuth in 1 liter. With the concentration lower than this limit, the resulting bismuth oxide has an extremely fine particle size; and with the concentration higher than this limit, the resulting bismuth oxide has an excessively large particle size.

In the oxidation step that is performed in the upper compartment (4), air is blown in an amount less than, preferably about one half, the amount of the inert gas. This is necessary to control the temperature of the bismuth oxide entering the subsequent cooling step to 250° to 300° C. If the temperature prior to the rapid cooling with cooling air is lower than 250° C. the resulting bismuth oxide becomes extremely fine powders; and if the temperature is higher than 300° C., the resulting bismuth oxide powders fuse together, interfering with the cooling effect.

The flow rate for suction by the suction pump should be 1 to 5 m/sec, preferably 2 to 3 m/sec. With a flow rate lower than this limit, the bismuth oxide powers fuse together, forming coarse particles; and with a flow rate higher than this limit, the bismuth oxide powder becomes excessively fine particles. The bismuth oxide thus obtained according to the process of this invention is in the form of fine powder having a particle diameter of 0.2 to 1 $\mu$m. If necessary. coarse particles may be removed by the use of a cyclone and bag filter.

The higher the heating temperature in the electric furnace, the higher the yield per hour. However, the heating temperature should not be excessively higher than the above-specified range in order that the resulting bismuth oxide powder has a narrow particle size distribution.

The invention is now described in more detail with reference to the following examples.

EXAMPLE 1

The apparatus used in this example was a 5 liter graphite sealed vessel (1). 3.5 kg of bismuth (99.9 wt % pure) was placed in the lower compartment (5) of the sealed vessel (1), followed by heating to 1100° C. by an electric furnace (11), whereby bismuth was molten and vaporized.

Simultaneously with heatihg, argon gas was blown into the lower compartment (5) at a flow rate of 50 liters/min through an inlet pipe (6) and air was blown into the upper compartment (4) at a flow rate of 25 liters/min through an inlet pipe (7). The bismuth-containing gas was sucked out by a vacuum pump at a flow rate of 300 liters/min through a suction pipe (8), and air (at 5° C.) was introduced into the suction pipe (8) at a flow rate of 225 liters/min through an air supply pipe (9). The operation was continued for 1 hour. The concentration of bismuth in the vapor in the lower compartment (5) was 0.2 g/liter, and the gas temperature before cooling in the upper compartment (4) was 265° C. Thus there was obtained 850 g of bismuth oxide powder having an average particle diameter of 0.5 $\mu$m. The average particle diameter was measured under a scanning electron microscope.

EXAMPLE 2

The same operation as in Example 1 was performed for 1 hour except that the conditions were changed as follows: Heating temperature: 1200° C.; inert gas: nitrogen, suction flow rate: 350 liters/min, suction flow rate of air (5° C.): 225 liters/min, flow rate of air to the upper compartment: 75 liters/min, and bismuth concentration in the vapor: 0.1 g/liter. There was obtained 750 g of bismuth oxide having an average particle diameter of 0.3 $\mu$m. The vapor temperature prior to rapid cooling was 250° C.

COMPARATIVE EXAMPLE

The same operation as in Example 1 was repeated except that the heating temperature and the flow rate of inert gas were changed as shown in the following table, in which the results are also shown.

| Heating tempera- ture (°C.) | Inert gas nitrogen (1/min) | Temperature before rapid cooling (°C.) | Bismuth oxide weight (g) | Bismuth oxide dia. ($\mu$m) | Concentra- tion of bis- muth in va- por (g/l) |
|---|---|---|---|---|---|
| 1000 | 75.0 | 250 | 250 | <0.1 | 0.12 |
| 1250 | 10.0 | 320 | 1100 | 2.0 | 0.52 |

It is noted from the above table that changing the amount of inert gas is associated with the particle size of the resulting bismuth oxide powder. As the amount of inert gas increases, the powder becomes finer; and as the amount of inert gas decreases, the powder becomes coarse.

As mentioned above, the process of this invention provides bismuth oxide in the form of spherical fine particles 0.2 to 1 $\mu$m in diameter. The bismuth powder thus obtained is superior in dispersibility and will find use as a variety of additives.

The process of this invention may be applied to the production of finely divided particulate oxides of low-melting metals (e.g., Zn, Te, Sb, Pb, and Se) and also to the production of low-melting metals in the finely divided particulate form if the cooling air is replaced by an inert gas.

What is claimed is:

1. A process for producing finely-divided particles of bismuth oxide using a sealed vessel which contains a partition wall therein that divides the sealed vessel into first and second compartments, the partition wall including a hole therein which extends between the first chamber and the second chamber, said process including the steps of:
    (a) placing elemental bismuth in said first chamber,
    (b) heating the bismuth in said first chamber to at least 800° C. so as to form bismuth vapor in said first chamber,
    (c) feeding inert gas into said first chamber so that the concentration of bismuth vapor therein is maintained between 0.1 to 0.5 g/liter,
    (d) blowing air into the second chamber so as to mix with the bismuth vapor and inert gas which passes therein through said hole from said first chamber and to react with the bismuth to form bismuth oxide, at the same time cooling the thus-formed bismuth oxide to between 250° and 300° C.,
    (e) sucking the bismuth oxide out of said second chamber in said sealed vessel at a flow rate of between 1 and 5 m/sec, and
    (f) contacting the bismuth oxide outside of said sealed vessel with cool air to precipitate finely-divided particles of bismuth oxide.

2. The process as defined in claim 1, wherein said inert gas used in step (c) is selected from the group consisting of argon and nitrogen.

3. The process as defined in claim 2, wherein in step (b) the bismuth is heated to between 1000° and 1250° C.

4. The process as defined in claim 2, wherein in step (e) the bismuth oxide is sucked out of said second chamber at a rate of between 2 and 3 m/sec.

5. The process as defined in claim 2, wherein in step (f) the bismuth oxide is contacted with air having a temperature of about 5° C.

6. The process as defined in claim 2, wherein the flow rate of air blown into said second chamber in step (d) is less than the flow rate of inert gas fed into said first chamber in step (c).

7. The process as defined in claim 6, wherein the flow rate of air blown into said second chamber in step (d) is about one half the flow rate of inert gas fed into said first chamber in step (c).

* * * * *